(12) United States Patent
Goss et al.

(10) Patent No.: US 6,535,140 B1
(45) Date of Patent: Mar. 18, 2003

(54) DEVICE FOR INFORMING A MOTOR VEHICLE DRIVER

(75) Inventors: Stefan Goss, Hildesheim (DE); Dietmar Kell, Diekholzen (DE)

(73) Assignee: Robert Bosch GmbH, Stuttgart (DE)

( * ) Notice: Subject to any disclaimer, the term of this patent is extended or adjusted under 35 U.S.C. 154(b) by 887 days.

(21) Appl. No.: 08/765,502

(22) PCT Filed: Apr. 20, 1996

(86) PCT No.: PCT/DE96/00698

§ 371 (c)(1), (2), (4) Date: Mar. 27, 1997

(87) PCT Pub. No.: WO96/35199

PCT Pub. Date: Nov. 7, 1996

(30) Foreign Application Priority Data

May 5, 1995 (DE) .......................................... 195 16 476

(51) Int. Cl.[7] ................................................ G08G 1/09
(52) U.S. Cl. ........................ 340/905; 340/995; 701/211
(58) Field of Search ................................ 340/905, 990, 340/995, 988; 364/449.3, 449.4; 701/208, 209, 211

(56) References Cited

U.S. PATENT DOCUMENTS

| | | | | |
|---|---|---|---|---|
| 4,812,843 A | * | 3/1989 | Champion, III et al. .... | 340/989 |
| 4,862,513 A | * | 8/1989 | Bragas ........................ | 340/905 |
| 5,020,143 A | * | 5/1991 | Duckeck et al. ............ | 340/905 |
| 5,031,104 A | * | 7/1991 | Ikeda et al. ............... | 364/449.3 |
| 5,131,020 A | * | 7/1992 | Liebesny et al. ........... | 340/905 |
| 5,182,555 A | * | 1/1993 | Sumner ...................... | 340/995 |
| 5,257,023 A | * | 10/1993 | Furuya ....................... | 340/995 |
| 5,272,638 A | * | 12/1993 | Martin et al. .............. | 340/990 |
| 5,293,163 A | * | 3/1994 | Kakihara et al. ........... | 340/988 |
| 5,313,200 A | * | 5/1994 | Sone .......................... | 340/990 |
| 5,317,311 A | * | 5/1994 | Martell et al. .............. | 340/901 |
| 5,406,490 A | * | 4/1995 | Braegas ..................... | 340/995 |
| 5,543,789 A | * | 8/1996 | Behr et al. .................. | 340/995 |
| 5,565,874 A | * | 10/1996 | Rode .......................... | 340/995 |
| 5,648,768 A | * | 7/1997 | Bouve ........................ | 340/905 |

FOREIGN PATENT DOCUMENTS

WO 9318495 * 9/1993 ................. 340/905

OTHER PUBLICATIONS

Tech. 3244–E, Mar. 1984 of the European Broadcasting Union (EBU).
Alert C, Nov. 1990, published by RDS ATT ALERT Consortium.

* cited by examiner

Primary Examiner—Brent A. Swarthout
(74) Attorney, Agent, or Firm—Kenyon & Kenyon

(57) ABSTRACT

A device for informing a motor vehicle driver having a decoder for digitally coded traffic messages and an auto navigator, which is designed to determine the instantaneous position of a vehicle and to calculate route recommendations, forming one basic structural unit. Preferably, a digitally coded road map, and information necessary for decoding and outputting the traffic messages are stored on the same data storage medium.

10 Claims, 2 Drawing Sheets

DEVICE FOR INFORMING A MOTOR VEHICLE DRIVER

FIELD OF THE INVENTION

The present invention relates to a device for informing a motor vehicle driver and more specifically for informing a motor vehicle driver about traffic conditions and routing.

BACKGROUND OF THE INVENTION

The Radio Data System (RDS) enables the additional and inaudible transmission of digital data, in parallel with radio programs, in a data channel. Specifications of the Radio Data System for VHF sound radio are defined, inter alia, in the publication *Tech*. 3244-*E*, March 1984 of the European Broadcasting Union (EBU). Besides receiving radio signals, radio receivers having the requisite RDS decoders can receive and decode transmitted data, using the same receiving part. The data transmission takes place in 32 groups of 108 bits each, a specific service being assigned to each group. The group 8*a* is provided for transmitting digitally coded traffic messages.

The structure and coding of these traffic messages are defined in detail in the proposed standard, *ALERT C*, November 1990, published by RDS ATT ALERT Consortium. The essential elements of a traffic message are the location of the occurrence and the event. This information is cataloged, i.e., a unique code is assigned to each location and event that have relevance to traffic. The locations are integrated in the location table along existing streets to reproduce the pattern. In addition to the customary receiver devices having an RDS decoder, in order to utilize the traffic report channel TMC (Traffic Message Channel), devices are needed for decoding, for storing, for further processing, and for outputting the traffic messages—also referred to in the following as TMC receivers.

Auto navigators have also become known, which determine the instantaneous position of a vehicle and, with the aid of a digitally stored road map and an entered travel destination, calculate and display proposed routes. To determine position, sensors, which detect the motion of the vehicle on the road surface, as well as satellite positioning systems (GPS) can be used. The calculated proposed routes can be output as maps with the proposed routes marked, or as an instruction on how to act at intersections and turn-offs. Thus, auto navigators are known, for example, where an arrow symbol that assumes different shapes and directions shows the motor vehicle driver the way. However, in known auto navigators, the route recommendations and, in some instances, other information are determined merely on the basis of a digitally stored road map, without giving consideration to vicissitudes in the road network, in particular temporary irregularities resulting from traffic jams or stoppages.

The object of the present invention is to improve the information given to the motor vehicle driver over known devices and systems in the event of obstructed traffic.

This objective is achieved in accordance with the present invention in that a decoder for digitally coded traffic messages and an auto navigator, which is designed to determine the instantaneous position of the vehicle and to calculate route recommendations, form one basic structural unit.

An advantage of the device according to the present invention is that by forming one basic structural unit, different components can be used both for decoding and managing traffic messages, as well as for the auto navigator. Besides attaining an economic advantage, quality is also improved, for example, through a more rapid signal processing.

Another advantage consists in that digitally coded traffic messages are taken into consideration when proposed routes are calculated and displayed. Moreover, the device according to the present invention plays a role in not giving the vehicle driver an unnecessary excess of visual or acoustic traffic messages that are not relevant to his or her probable route, in that the instantaneous position of the vehicle, an entered destination and proposed routes are considered when selecting the traffic messages to be output.

The interaction of the auto navigator and the decoding and outputting of traffic messages leads, in addition, to the advantages known from both systems, as well as to an improvement in the travel information supplied by the auto navigator.

The improved output of traffic messages consists above all in that by knowing the position of the vehicle determined at any one time by the auto navigator and the destination entered by the user, traffic messages to be output are able to be selected quite expediently from the total of those received. Thus, in most operational cases, it makes sense for the vehicle driver to receive only those traffic messages which relate to his or her probable route or to alternative routes. The travel or route recommendations are improved when working with the device according to the present invention because they are calculated in view of the received and decoded traffic messages. In particular, traffic messages, which pertain to traffic jams or slow moving traffic, can thereby be converted into traffic resistance values, which are then compared to determine various alternative routes.

Although it is not ruled out within the scope of the invention to consolidate into one basic unit including a radio receiver, one preferred specific embodiment provides for the digitally coded traffic messages to be able to be supplied by a radio receiver.

One further embodiment of the present invention consists in that a digitally coded road map, and information necessary for decoding and outputting the traffic messages are stored on the same data storage medium. This storage device is preferably a compact disk (CD ROM), which, because of its large memory capacity of, for example, 640 MByte, in addition to the volume of data required for the digitally coded road map, is able to store considerably more data than the chip card provided for TMC receivers.

Therefore, this further embodiment is preferably so conceived that the information required for decoding and outputting the traffic messages is stored in a location list, which includes at any one time selected locations in coded form, locations adjacent to the selected locations, route sections belonging to the selected locations, and names of the selected locations.

The location names can be in the form of coded graphic characters, such as ASCII codes and/or phonetic codes. Furthermore, the location names can be stored in several languages, provided that it is customary for the locations in question to have location names in several languages. Finally, even the phonetic code of a location name can be stored repeatedly to enable the location name to be adapted to the remaining part of a traffic message.

Because of its designated purpose, namely to decode and output traffic messages, the location list provided for TMC receivers has a structure that is quite different from that of a digital road map. In particular, the location lists in accordance with ALERT C are distinguished in that the locations are described with a point-to-point orientation and that, depending on the location, the amount of data is relatively small because of the storage medium provided for TMC receivers. Moreover, the TMC system provides for different location lists. Therefore, when a TMC receiver (inclusive of the decoder) and an auto navigator, including one storage medium each for the location list and for the digitally coded road map, interact, it is necessary to adjust the data between the location list and the road map. Therefore, given a lack of conformity, which can also be caused, inter alia, by different revision levels of the storage media, an interaction between the TMC receiver and the auto navigator is adversely affected or is even impossible.

However, when the same storage medium is used, it is possible to record data that have been reconciled to one another when the storage medium was manufactured. When the user acquires a new storage medium, along with a new version of the road map, he or she then automatically receives the matching location list used in decoding and reproducing traffic messages.

Due to the limited capacity of the chip card to store location names, the quality of the voice alert has been limited till now in known TMC receivers. This disadvantage is not associated with the device according to the present invention. A further embodiment of the device according to the present invention, therefore, provides for using a speech generator in connection with an auto navigator to output the traffic messages. Because of the smaller vocabulary of the auto navigator, this speech generator is designed right from the start to be of a higher quality. The vocabulary to be used in the voice alert system is then coded using the methods provided for auto navigators, for example, with adaptive, differential pulse-code modulation (ADPCM).

Another embodiment of the present invention consists in outputting the traffic messages and the routes recommended by the auto navigator with the aid of a monitor. The monitor can be conceived as a liquid-crystal arrangement. Besides economizing on a video screen, this further embodiment has the advantage that the vehicle driver merely needs to direct his or her attention to one monitor to receive traffic messages and route recommendations.

This further embodiment can provide for the traffic messages to be output in an alphanumeric representation and the route recommendations in a graphic representation on the monitor. This output form, which can take place optionally in addition to a voice alert, is especially advantageous when the route recommendations are output in the form of arrows or other instructions.

However, if route recommendations are output in the rendering of the road map display, then it is possible within the scope of the present invention for the traffic messages to be conveyed as embedded messages in the road map display, preferably in symbol form.

DETAILED DESCRIPTION

Figure 1:
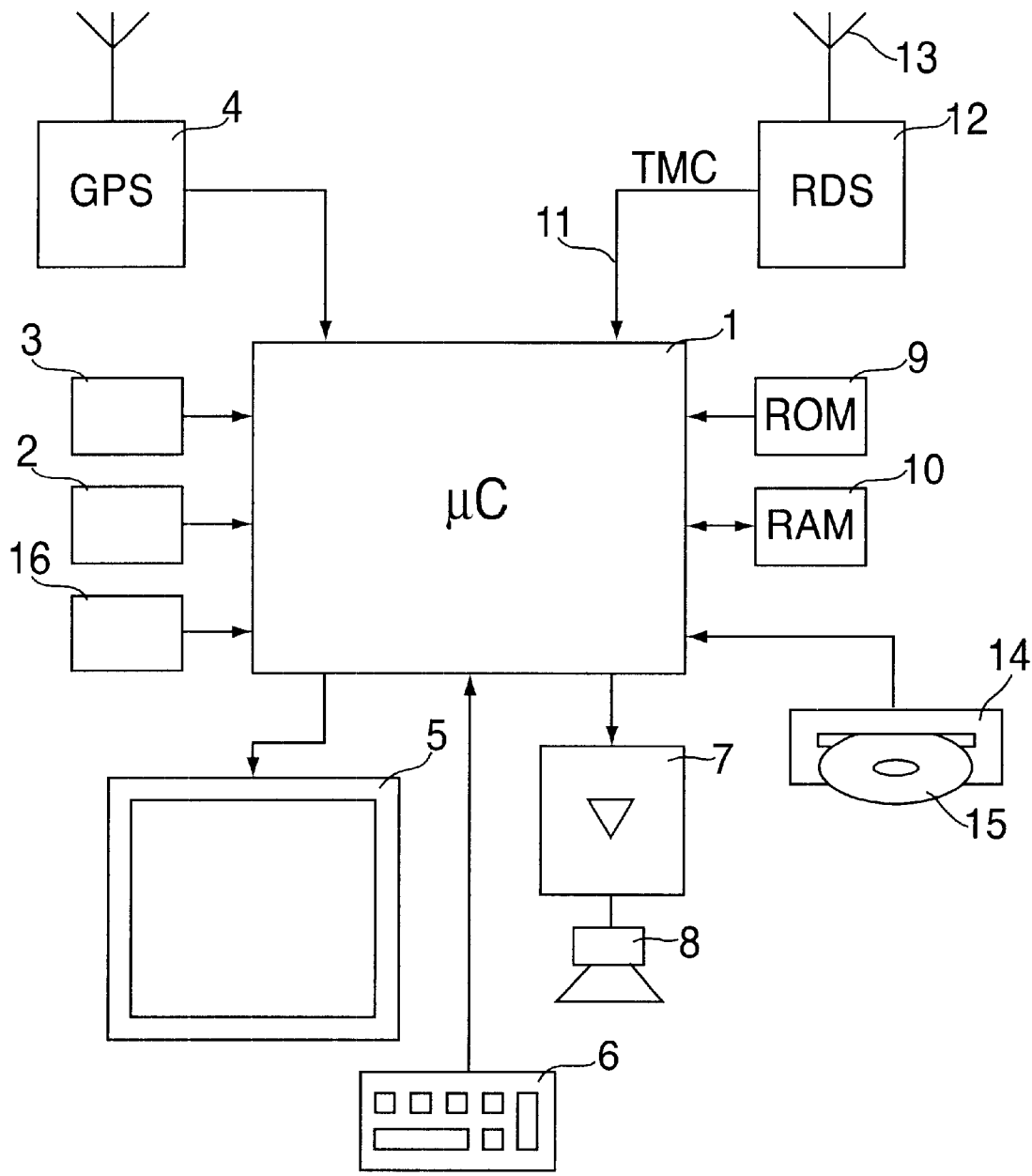
FIG. 1 shows a block diagram of a device in accordance with the present invention.

In the exemplary embodiment shown in FIG. 1, a microcomputer 1 oversees the functions of the auto navigator, as well as the decoding of the traffic messages and the controlling of the output. This microcomputer 1 has a large enough computing capacity to perform quickly enough all the computational operations required for the auto navigator functions and for decoding and outputting the traffic messages. Linked to microcomputer 1 for navigational purposes are wheel sensors 2 for monitoring position and motion, a digital compass 3, likewise for monitoring position and motion, and a GPS receiver 4 for determining position.

To output the traffic messages and the route recommendations, a graphics monitory (display) 5 is used. Manual inputs can be made at a keyboard 6. An audio amplifier 7 and a loudspeaker 8 are provided for acoustically outputting travel information and traffic messages. Programs for microcomputer 1 and constants are stored in a read-only memory (ROM) 9. To decode and output traffic messages, these constants comprise, inter alia, an event list, which contains event names corresponding to the event codes contained in the traffic messages, optionally in several languages. Stored in read-only memory 9 are also carrier records, into which an event name and location names are inserted depending on the content of the traffic message. For a voice alert, the event names and carrier records can be stored phonetically.

A read-write memory 10 is used for buffering various data, such as received traffic messages. Microcomputer 1 is linked by a suitable data connection 11 to a radio receiver 12, which receives digitally coded traffic messages via an antenna 13 and routes them to microcomputer 1.

A CD ROM disk drive 14 with a CD ROM 15 is used to store a digitally coded road map and the corresponding location-specific data of the TMC system.

The entire device is program-oriented. This means that each individual component generates information which is uncorrelated as a function of time and can be supplied to microcomputer 1. Microcomputer 1 is able to receive the information fast enough and buffer it in read-write memory 10.

The user can enter a destination at keyboard 6. At regular intervals, sensors 2, 3, 4 supply information on whose basis the instantaneous position is newly determined and reconciled to the digital road map stored on CD ROM 15. The corresponding map detail can then be shown on the display, and a travel or route recommendation for the entered travel destination can be made as a voice alert through audio amplifier 7 and loudspeaker 8 or as a text or arrow representation through display 5. An example of this is the text, "two streets up, turn left".

The radio signals received via antenna 13 are demodulated in receiver 12. If data signals are contained in the radio signals, then they are likewise extracted and decoded in receiver 12. The possibly included digitally coded traffic messages are then routed to microcomputer 1 in a format standardized by ALERT C and are buffered in read-write memory 10. Microcomputer 1 performs a decoding in accordance with ALERT C. For traffic messages, which include absolute times of day, it is necessary to make a comparison to the current time of day that microcomputer 1 can extract from a clock 16.

Figure 2:
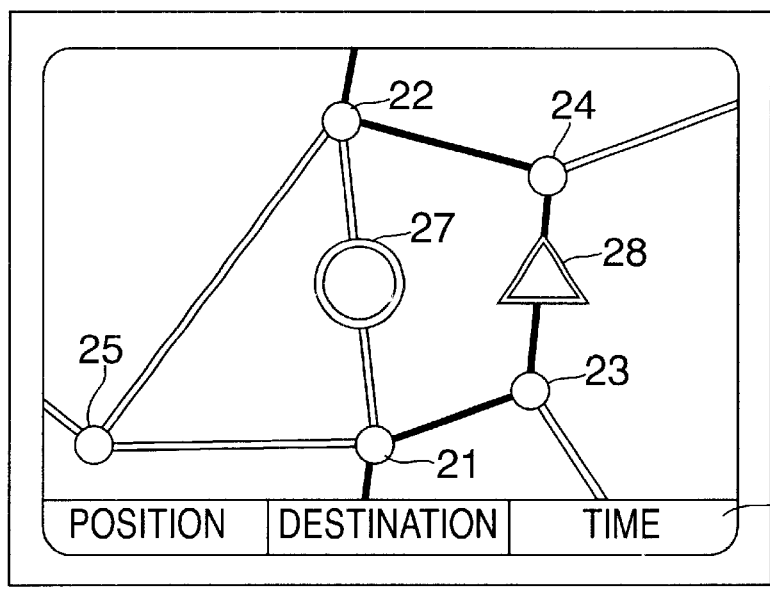
FIG. 2 shows an example of a monitor display according to the present invention.

FIG. 2 shows an example of a display of a road map detail including locations 21, 22, 23, 24, 25 and several streets. The momentary position, the entered destination, and the time of day are shown alphanumerically in a lower subsection 26. A route recommendation initially computed by the navigational system runs from the bottom, via locations 21 and 22, to the top. Prior to the point in time represented here, two traffic messages had been received, namely a traffic message which referred to a complete stoppage between locations 21 and 22, while a second traffic message referred to a (slight) obstruction between locations 23 and 24. These traffic messages are shown as symbols 27, 28, which are configured in conformance with known traffic signs.

After the traffic messages are received, alternative routes are calculated in microcomputer 1 and compared to the direct connection between locations 21 and 22. It turns out that in spite of the obstruction between locations 23 and 24, this alternative route is better than an alternative route via location 25. For that reason, the alternative route via locations 21, 23, 24, 22 is highlighted by varying its color and/or intensity.

Figure 3:
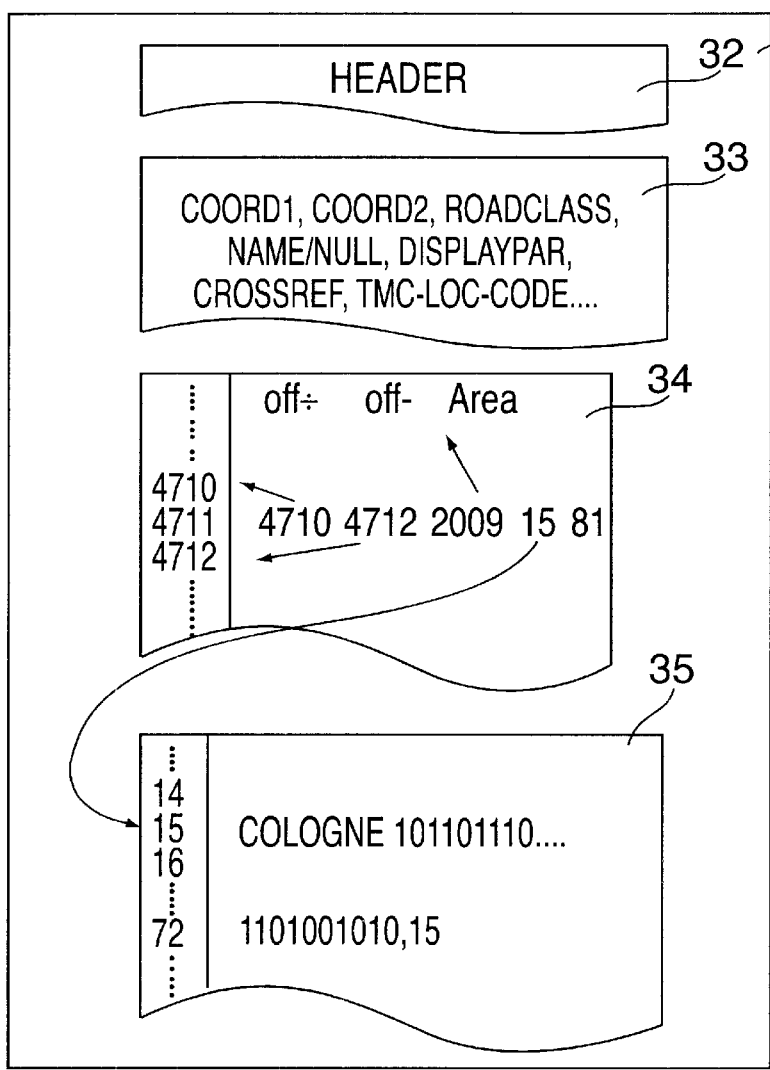
FIG. 3 shows a schematic representation of the memory contents of a compact disk provided in the device according to the present invention.

FIG. 3 shows schematically the essential content 31 of CD ROM 15 (FIG. 1). A header 32 contains general information describing the contents of the CD ROM, for example the area that the road map and the location list refer to, the update status, and which location lists are stored in accordance with ALERT C on the CD-ROM. Data which make up the road map are stored in a data file 33 or group of data files.

For each route section, data file 33 contains a number of data, of which only a few are elucidated in the following. The position of the route section within the road map is defined by the coordinates COORD1 and COORD2 of the end points of the route section. Furthermore, the type of street ROADCLASS, as well as a name, if available, are stored. Various display parameters DISPLAYPAR control the momentary representation of the road section and, if indicated, the name on the screen. For example, this includes information indicating the display scale of the route section in question. Thus, for example, only highways are shown when working with a very small scale, while, for example, local streets are also displayed when working with a very large scale.

In addition, data file 33 includes a cross-reference CROSSREF to other streets. The location code TMC-LOC-CODE of the TMC system is significant when traffic messages are evaluated to calculate route recommendations. The location codes of the nearest location of the TMC system are assigned to the route sections. For example, if the route between locations 21 and 22 (FIG. 2) consists of six route sections, the three route sections contiguous to location 21 receive its location code, and the other three receive the location code of location 22.

In the exemplary embodiment shown in FIG. 3, the location list is divided into two parts, namely into one part 34 which contains the information necessary to decode the traffic message, and into one part 35, which contains the information for the voice alert. The advantage of dividing the location list into two in this way is that the first part 34 has a constant mantissa for each location code and, therefore, can be addressed simply by a decoding program.

In the illustrated example, one can perceive that the location with code number 4711 belongs to an area 2009, and that the neighboring locations are 4710 and 4712. Moreover, part 34 of the location list contains identifiers, which are used to read out the location names and other designations out of part 35 of the list. Thus, for example, identifier 15 can signify the word "Cologne" and identifier 81 the word "North".

In the illustrated second part 35 of the location list, the location name Cologne is stored at identifier 15 in ASCII symbols for a written output, and as a digital ADPCM signal for a voice alert. Other ADPCM signals can follow for outputs in other languages. Identifier 72 refers to a program exit 15, the word program exit likewise being represented as an ADPCM signal, while number 15 is stored as a number and is converted by the voice synthesizer program into the spoken number in the respective language. The codes of the adjacent locations are needed for the decoding operation, to be able to decode the distances between adjacent locations to the extent they are transmitted in accordance with ALERT C.

What is claimed is:

1. A device for informing a motor vehicle driver comprising:
   a receiver for receiving and decoding at least one digitally coded traffic message;
   an auto navigator for determining an instantaneous position of a vehicle and at least one route recommendation; and
   only one data storage unit having a data storage medium for storing both a digitally coded road map and information needed for decoding and outputting the at least one traffic message;
   wherein the receiver, the auto navigator and the data storage unit form a single structural unit.

2. The device according to claim 1, wherein the at least one route recommendation is determined from at least one decoded traffic message.

3. The device according to claim 1, wherein the receiver is a radio receiver.

4. The device according to claim 1, wherein the information needed for decoding and outputting at least one decoded traffic message includes selected locations, locations adjacent to the selected locations, route sections belonging to the selected location and names of the selected locations.

5. The device according to claim 1, further comprising a speech generator for outputting the at least one decoded traffic message.

6. The device according to claim 1, further comprising a monitor for displaying the at least one decoded traffic message and the at least one route recommendation.

7. The device according to claim 6, wherein the at least one decoded traffic message is displayed alphanumerically and the at least one route recommendation is displayed graphically using the monitor.

8. The device according to claim 6, wherein the at least one decoded traffic message is displayed as at least one embedded message in a road map display.

9. The device according to claim 8, wherein the at least one embedded message is displayed in symbol form.

10. The device according to claim 1, further comprising a circuit for selecting at least one decoded traffic message based on the instantaneous position of the vehicle, an entered destination and at least one proposed route.

* * * * *